(12) United States Patent
Mendlovic et al.

(10) Patent No.: US 12,236,713 B2
(45) Date of Patent: Feb. 25, 2025

(54) SYSTEM AND METHOD FOR IDENTIFYING A PERSON IN A VIDEO

(71) Applicant: Ramot at Tel-Aviv University Ltd., Tel-Aviv (IL)

(72) Inventors: David Mendlovic, Tel Aviv (IL); Dan Raviv, Tel Aviv (IL); Lior Gelberg, Tel Aviv (IL); Khen Cohen, Tel Aviv (IL); Mor-Avi Azulay, Tel Aviv (IL); Menahem Koren, Tel Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 0 days.

(21) Appl. No.: 18/713,653

(22) PCT Filed: Nov. 30, 2022

(86) PCT No.: PCT/IB2022/061602
§ 371 (c)(1),
(2) Date: May 26, 2024

(87) PCT Pub. No.: WO2023/100105
PCT Pub. Date: Jun. 8, 2023

(65) Prior Publication Data
US 2024/0420504 A1    Dec. 19, 2024

Related U.S. Application Data

(60) Provisional application No. 63/284,643, filed on Dec. 1, 2021.

(51) Int. Cl.
*G06V 40/16* (2022.01)
*G06V 10/82* (2022.01)
*G06V 20/40* (2022.01)

(52) U.S. Cl.
CPC ............ *G06V 40/176* (2022.01); *G06V 10/82* (2022.01); *G06V 20/41* (2022.01); *G06V 40/161* (2022.01); *G06V 40/171* (2022.01)

(58) Field of Classification Search
CPC .... G06V 40/176; G06V 40/171; G06V 10/82; G06V 40/161; G06V 20/41
See application file for complete search history.

(56) References Cited

U.S. PATENT DOCUMENTS

2009/0285456 A1* 11/2009 Moon ................. G06V 40/176
                                                                  382/118
2014/0310208 A1* 10/2014 Fasel ..................... G06N 20/00
                                                                  706/12

(Continued)

OTHER PUBLICATIONS

Golzadeh, Hamid, et al. "Emotion recognition using spatiotemporal features from facial expression landmarks." 2018 International Conference on Intelligent Systems (IS). IEEE, 2018. (Year: 2018).*

(Continued)

*Primary Examiner* — Utpal D Shah
(74) *Attorney, Agent, or Firm* — Nathan & Associates; Menachem Nathan (57) ABSTRACT

Systems, methods, and computer readable media for identifying a person in a video are disclosed. Systems, methods, devices, and non-transitory computer readable media may include at least one processor that may be configured to generate a spatiotemporal emotion data compendium (STEM-DC) from the video and to process the STEM-DC using a deep fully adaptive graph convolutional network (FAGC) to determine a first person representation vector that represents the person in the video.

11 Claims, 10 Drawing Sheets

(56) References Cited

U.S. PATENT DOCUMENTS

| | | | |
|---|---|---|---|
| 2018/0018508 A1* | 1/2018 | Tusch | G06V 20/52 |
| 2018/0174412 A1 | 6/2018 | Danielsson et al. | |
| 2019/0122071 A1* | 4/2019 | Jin | G06V 40/174 |
| 2019/0213400 A1* | 7/2019 | Kim | G06V 10/82 |
| 2020/0134296 A1 | 4/2020 | Rajvanshi et al. | |
| 2020/0234690 A1* | 7/2020 | Savchenkov | G10L 13/08 |
| 2021/0279475 A1 | 9/2021 | Tusch et al. | |
| 2022/0237751 A1* | 7/2022 | Bradley | G06T 5/77 |

OTHER PUBLICATIONS

Ngoc, Quang Tran, Seunghyun Lee, and Byung Cheol Song. "Facial landmark-based emotion recognition via directed graph neural network." Electronics 9.5 (2020): 764. (Year: 2020).*

Search Report in related PCT application PCT/IB2022/061602, dated Mar. 6, 2023.

Written Opinion in related PCT application PCT/IB2022/061602, dated Mar. 6, 2023.

ESR in related EP patent application 22900774.5 dated Nov. 5, 2024.

Office Action in related EP patent application No. 22900774.5, dated Nov. 15, 2024.

Gelberg Lior et al: "Skeleton-Based Typing Style Learning For Person Identification", 2022 IEEE/CVF Winter Conference On Applications of Computer Vision Workshops.

* cited by examiner

SYSTEM AND METHOD FOR IDENTIFYING A PERSON IN A VIDEO

CROSS-REFERENCE TO RELATED APPLICATIONS

This is a 371 application from international patent application PCT/IB2022/061602 filed Nov. 30, 2022, which is based on and claims benefit of priority of U.S. Provisional Patent Application No. 63/284,643, filed Dec. 1, 2021, the contents of which are incorporated herein by reference in its entirety.

FIELD

Embodiments of the disclosure relate to methods of processing facial images of a person to identify the person.

BACKGROUND

As human communications gravitate away from mediation by face-to-face interactions to mediation by technology, people may increasingly communicate and interact with each other and with computers via video presentations. To support functional operation of such communications and interactions, an ability to accurately identify a person appearing in a video is paramount not only simply to know who is communicating and interacting with whom or with what computer application, but to protect the communications and interactions against malicious counterfeit and distortion. The complexity and difficulty involved in providing robust, accurate identification may be compounded as globalization mixes and promotes interaction between populations of different cultures and ethnicities, lifespans increase, and sophistication and capability of communications and data processing technologies advance. Modern communications technologies and applications are required to sustain an increasing volume of communications in which people of different facial physiognomy may communicate via video, a same person may communicate via video at very different ages during his or her lifetime, and people may appear in videos set in different natural, artificial, and virtual settings. Additionally, reliable trustworthy communications are threatened as data processing and artificial intelligence technologies of rapidly increasing capability proliferate and may be used to generate videos in which counterfeit persons may communicate with and damage and/or subliminally influence the behavior of targeted people and communities.

The very different and increasing variety of circumstances, contexts, and conditions in which people may appear in videos may challenge the abilities of current facial recognition technologies to accurately identify these people.

SUMMARY

Aspects disclosed herein relate to providing a system and method for extracting and melding spatial, temporal, and emotional data (STEM data) from a video for use in identifying a face or other characteristic of a person appearing in the video and a fully adaptive graph convolutional network (FAGC) for processing the data to identify the person. The method for extracting, configuring, and using the STEM data to identify the person in the video may be referred to herein as a STEM identity recognition method or STEM-IDR. STEM-IDR may be implemented as instructions that when executed by at least one processor, cause the at least one processor to perform the extracting, configuring, and use of STEM data to identify a person in a video and/or generate a person representation vector that is unique to the person in the video.

In accordance with an embodiment of the disclosure STEM-IDR may include extracting from each of a plurality of sequential frames in a video, features identifying and characterizing anatomical facial landmarks of a person appearing in the frames and features characterizing an emotional/psychological state that the person may be inferred to exhibit in the frames. In some embodiments, STEM-IDR may use features characterizing the anatomical facial landmarks to define a landmark feature vector (LF) for the frame, and features characterizing the emotional state to define an emotion feature vector (EF) for the frame. Whereas anatomical facial landmarks of a human face may typically be considered relatively conspicuous features of the face such as but not limited to the commissures of the lips or eyes, endpoints of the eyebrows, edges of the nostrils, and the bridge and tip of the nose, practice of embodiments of the disclosure are not limited to such conspicuous features. By way of example, facial landmarks in accordance with an embodiment may include features characterizing regions of facial skin texture, and ephemeral features such as wrinkles and dimples that appear, disappear, or change shape during particular facial gestures. In an embodiment landmarks may include vertices and/or edges of a polygonal facial mesh, such as a triangle mesh, constructed to model the surface of a face.

In some embodiments, STEM-IDR may operate to define for the frames of the video a basis set of "S" emotion basis vectors $B(s)$ $1 \leq s \leq S$ that substantially span a space of the emotion state vectors EF. Each emotion basis vector $B(s)$ may be considered to represent basic emotional states that a person may be inferred to be in, in each frame of the sequential frames of the video. For each frame the emotion feature vector, EF, determined for the frame may be projected onto the emotion basis vectors to determine an emotion projection vector PB. Each component of the emotion projection vector may provide a probability that in the frame the person in the video is in a different one of the S basic emotional states represented by the emotion basis vectors.

In some embodiments, STEM-IDR may use the determined probabilities to determine for each first basic emotional state in a first frame of the video and each second basic emotional state in a second, subsequent frame of the video (that may not be a consecutive frame), a transition probability that the person transitioned from the first basic emotional state to the second basic emotional state.

In accordance with some embodiments, STEM-IDR may use the transition probabilities to generate for the video a spatiotemporal emotion STEM data compendium (STEM-DC) that may associate with each ordered pair of the defined plurality of basic emotional states a global landmark feature vector (GLFV). The global landmark feature vector, GLFV, associated with a given ordered pair of basic emotional states may include a set of components each of which is a function of at least one landmark feature vector LF determined for the frames weighted by a transition probability associated with the ordered pair of basic emotional states.

In accordance with some embodiments, the STEM-DC may be processed as a graph by a fully adaptive graph convolutional network (FAGC). Nodes of the graph may be the cells of the STEM-DC each relating to a state transition and the node features may be the global landmark vectors. An adjacency matrix for the nodes may be learned by the FAGC for each of a plurality of layers in the FAGC from the data associated with each sample of a person that the FAGC is intended to identify.

Consistent with some disclosed embodiments, systems, methods, and computer readable media for identifying a person in a video are disclosed. Systems, methods, devices, and non-transitory computer readable media may include at least one processor that may be configured to generate a spatiotemporal emotion data compendium (STEM-DC) from the video; and to process the STEM-DC using a deep fully adaptive graph convolutional network (FAGC) to determine a first person representation vector that represents the person in the video.

In some embodiments, the at least one processor that may be further configured to compare the first person representation vector with a subsequent second person representation vector determined from a subsequent video and subsequent STEM-DC, to thereby identify the person as appearing in the subsequent video when the first and second person representation vectors are substantially similar.

In some embodiments, the first and second person representation vectors may be based on an identifiable trait of the person in the video. In some embodiments, the identifiable trait may include at least one of face, emotion, gait, body, limb, or typing style.

In some embodiments, the generating the STEM-DC may include generating an iterated feature vector (IFV). In some embodiments, the generating the IFV may include iterating a series of landmark feature vectors weighted by functions of transition probabilities between basic emotional states of the person detected in subsequent frames of the video. In some embodiments, the functions of transition probabilities may be represented by a transition weight sum matrix (WSUM).

In some embodiments, each of the basic emotional states may be determined by projecting an emotion feature vector onto a series of emotion basis vectors. In some embodiments, each of the series of landmark feature vectors for a given facial image may include L landmarks characterized by P features. In some embodiments, the series of landmark feature vectors may be determined by processing facial images extracted from the video using a pretrained facial landmark extraction net (FLEN), to identify the L facial landmarks each characterized by P features.

In some embodiments, facial images from the video may be extracted by locating and rectifying images of a person's face located in the video. In some embodiments, the FAGC may include a feature extraction module and a data merging module that includes a plurality of convolution blocks. In some embodiments, a resolution of the basic emotional states may be increased for a video having a higher frame rate.

Consistent with some disclosed embodiments, systems, methods, devices, and non-transitory computer readable media may include at least one processor that may be configured to identify person in a video, by: acquiring a video having a plurality of video frames in which a face of a person appears; processing each frame to determine an emotion feature vector (EF) and a facial landmark feature vector (LF) for the face in each frame; projecting the EF onto each emotion basis vector of a set of emotion basis vectors that span the space of the EF vectors to determine a probability that the person in the frame is exhibiting a basic emotional state represented by the emotion basis vector; using the probabilities to determine for each first basic emotional state that the person has a determined probability of exhibiting in a first frame of the video and each second basic emotional state that the person has a determined probability of exhibiting in a second, consecutive frame of the video, a transition probability that the person transitioned from the first basic emotional state to the second basic emotional state; using the LF vectors and the transition probabilities to determine a STEM data compendium that associates with each ordered pair of the basic emotional states a set of components each of which is a function of at least one landmark feature vector LF determined for the video frames weighted by a transition probability associated with the ordered pair; and using a fully adaptive graph convolution network to process the data compendium as a graph and produce a person representation vector.

This Summary is provided to introduce a selection of concepts in a simplified form that are further described in the Detailed Description below. It may be understood that this Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale.

DETAILED DESCRIPTION

Reference will now be made in detail to non-limiting examples of implementations for identifying a person in a video which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Aspects of this disclosure may provide a technical solution to the challenging technical problem of identifying a person in a video and may relate to a system for extracting STEM data from a video for use in identifying a person appearing in the video with the system having at least one processor (e.g., processor, processing circuit or other processing structure described herein), including methods, systems, devices, and computer-readable media. For ease of discussion, example methods are described below with the understanding that aspects of the example methods apply equally to systems, devices, and computer-readable media. For example, some aspects of such methods may be implemented by a computing device or software running thereon. The computing device may include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Figure 1:
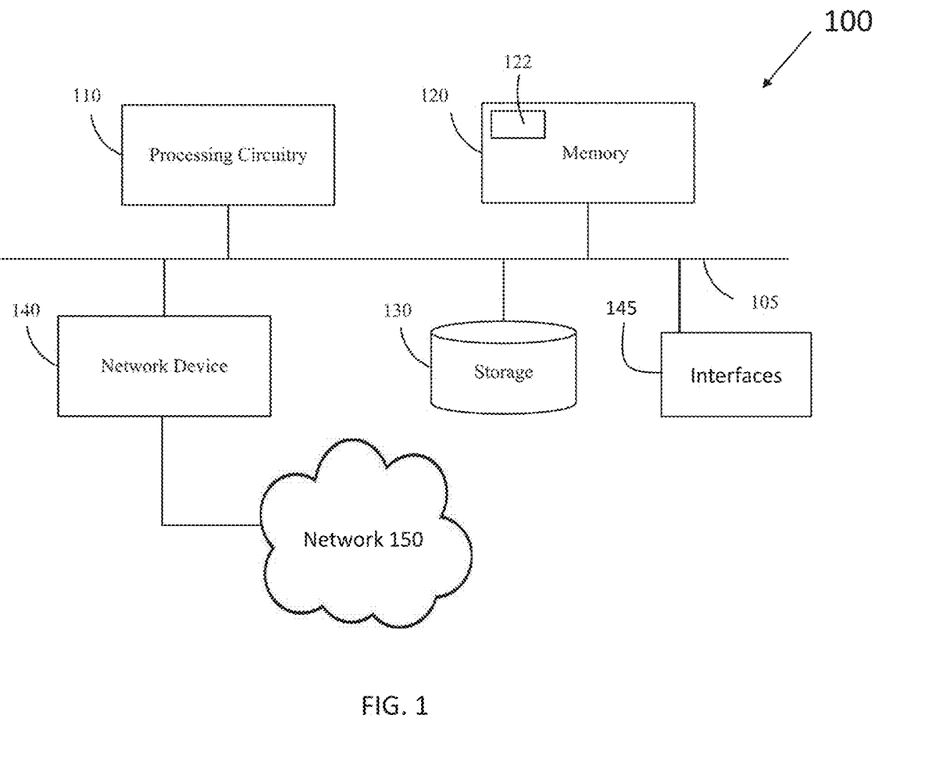
FIG. 1 is a block diagram of an exemplary computing device for extracting and melding STEM data from a video for use in identifying a face or other identifiable aspect of a person appearing in the video, according to some implementations.

FIG. 1 is a block diagram of an exemplary computing device 100 for extracting and melding STEM data from a video for use in identifying a face or other identifiable aspect of a person appearing in the video, according to some implementations. The computing device 100 may include processing circuitry 110, such as, for example, a central processing unit (CPU). In some embodiments, processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry such as processing circuitry 110 may be coupled via a bus 105 to a memory 120.

Memory 120 may further include a memory portion 122 that may contain instructions that when executed by processing circuitry 110, may perform the processes and methods described in more detail herein. Memory 120 may be further used as a working scratch pad for processing circuitry 110, a temporary storage, and others, as the case may be. Memory 120 may be a volatile memory such as, but not limited to, random access memory (RAM), or non-volatile memory (NVM), such as, but not limited to, flash memory. Processing circuitry 110 may be further connected to a network device 140, such as a network interface card, for providing connectivity between computing device 100 and a network, such as a network 150. Processing circuitry 110 may be further coupled with a storage device 130. Storage device 130 may be used for the purpose of storing videos, video frames, data structures and/or data elements associated with the data structures, or any other data structures. While illustrated in FIG. 1 as a single device, it is to be understood that storage device 130 may include multiple devices either collocated or distributed.

Processing circuitry 110 and/or memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, system 100 may include human and hardware interfaces 145. Human interface devices may include a screen, a keyboard, a touch interface, and/or a mouse Non-limiting examples of the uses of interfaces 145 may include for enabling by a user of system 100 input of data or parameters, or for indicating of a video to be processed or a person to be identified, or for displaying by system 100 of a processed video or an identified person or the status of processing by STEM-IDR including the processes (200, 300, 400) described herein. Hardware interfaces may provide for transferring files such as a video to be processed to other components of system 100. Video files may also be received or retrieved over network 150.

While system 100 is presented herein with specific components and modules, it should be understood by one skilled in the art, that the architectural configuration of system 100 as shown may be simply one possible configuration and that other configurations with more or fewer components are possible. As referred to herein, the "components" of system 100 may include one or more of the modules or services shown in FIG. 1 as being included within system 100. Where STEM-IDR or system 100 may be said herein to provide specific functionality or perform actions, it should be understood that the functionality or actions may be performed by processing circuitry 110 running software that may call on other components of system 100 and/or external systems (not shown).

Figure 2A:
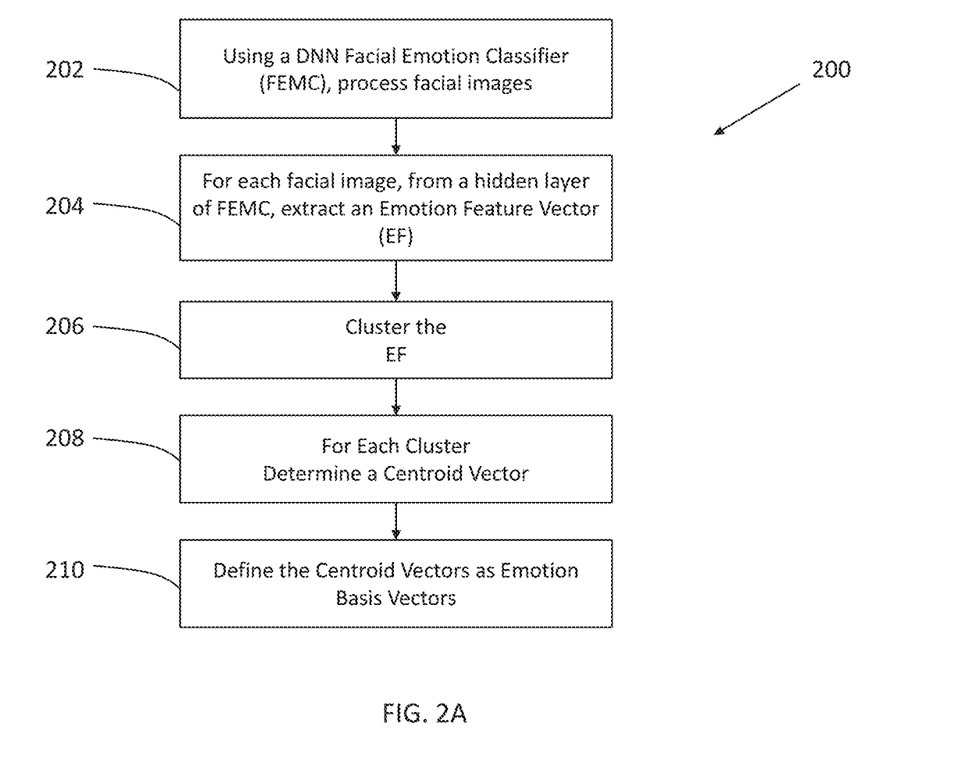
FIG. 2A shows a flow diagram of a process for generating a set of emotion basis vectors for processing a video to determine emotional states of a person in a video that may be advantageous for identifying the person, according to some implementations.
Figure 2B:
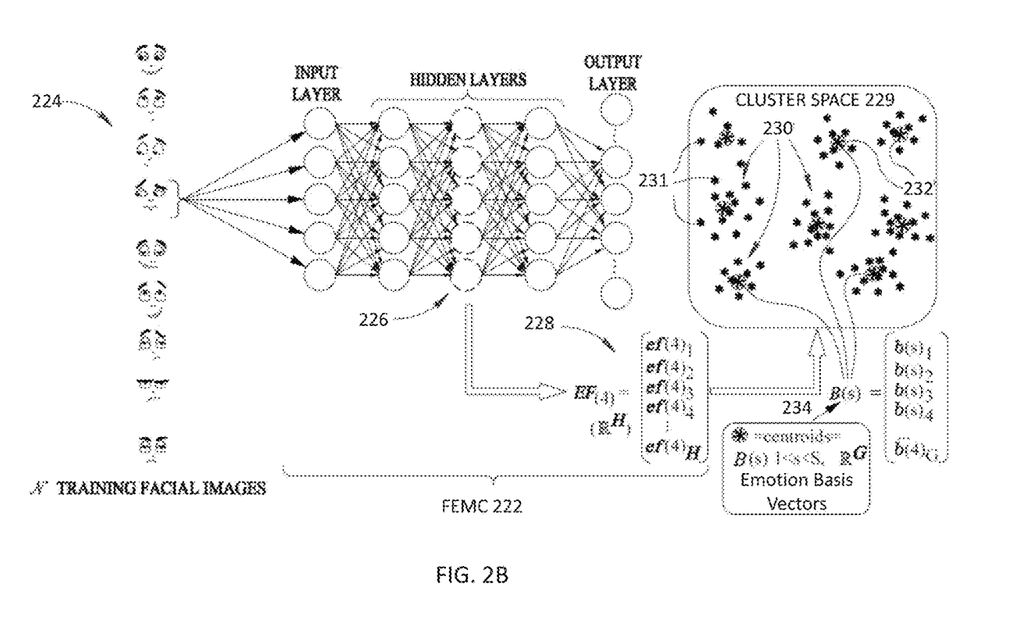
FIG. 2B shows a schematic visual representation of the flow diagram shown in FIG. 2A, according to some implementations.

FIG. 2A shows a flow diagram of a process 200 that may determine a set of emotion basis vectors for use in characterizing emotional states of a person appearing in a video and identifying the person, in accordance with an embodiment of the disclosure. FIG. 2B presents a graphic illustration of operation of process 200 and schematically shows features and entities referred to in the flow diagram, in accordance with an embodiment of the disclosure.

A non-transitory computer readable medium may contain instructions that when executed by at least one processor, causes the at least one processor to determine a set of emotion basis vectors for use in characterizing emotional states of a person appearing in a video and identifying the person such as in process 200. Process 200 may be a part of STEM-IDR. Process 200 may for example be performed by system 100 as described above. A non-transitory computer readable medium may contain instructions that when executed by at least one processor performs the operations described at each step as part of process 200. The at least one processor may correspond to system 100 and/or processing circuitry 110.

In step 202 a deep neural network (DNN) facial emotion classifier (FEMC) may be pretrained to classify emotional states that may be inferred from facial images to classify emotional states expressed in N facial training images of different people. In some embodiments, a DNN may be used to classify other identifying characteristics of different people based on images related to these characteristics. Non-limiting examples of such characteristics may include gait or typing style or body identifiers, and so forth. The implementations and examples provided herein relate to facial identification, but this should not be considered limiting and it should be appreciated that the system described herein may be applied to identification of other characteristics associated with an individual to enable identification of the individual. The FEMC is schematically shown in FIG. 2B as a classifier 222 operating to classify an emotional state for a 4th image of the N facial training images 224 that the classifier may be used to classify.

In step 204 a set of H emotion features may be extracted from a same hidden layer, schematically shown in FIG. 2B as a layer 226 of FEMC 222, for each processed training image that may be used in accordance with an embodiment to define an embedded emotion feature vector EF of dimension $\mathbb{R}^H$ for the image. For an $n^{th}$ (1≤n≤N) facial expression training image the extracted embedded emotion feature vector may be described by the following equation (1), $$EF(n)=\{ef(n)_1, ef(n)_2, ef(n)_3, ef(n)_4, \ldots ef(n)H\}=\{ef(n)_h | \mathbb{R}^H\}. \quad (1)$$

FIG. 2B schematically shows an emotion feature vector $EF(4)=\{ef(4)_h | \mathbb{R}^H\}$ labeled by the numeral 228 that may be extracted from layer 226 for training image 4 processed by FEMC 222.

In some embodiments, in step 206 the N feature vectors EF(n) may be clustered in a cluster space 229, schematically represented by small asterisks 231 in FIG. 2B, determined for the N facial training images into a plurality of an, optionally predetermined, number S of clusters 230.

In step 208 a centroid vector 232 of dimension $\mathbb{R}^G$ may optionally be determined for each cluster. It is noted that the dimension G of the centroid vectors 232 may be equal to or less than the dimension H of the embedded emotion feature vectors EF(n). For example, G may be less than H if the centroid vectors are found to lie on a hyperplane of the space that contains embedded emotion features vectors. Or it may be determined responsive to a principal component analysis that a number G of components less than H may advantageously be used to characterize embedded emotion feature vectors EF(n).

In some embodiments, in step 210, the S centroid vectors 232 may be defined as emotion basis vectors B(s), 1≤s≤S, indicated by label 234 in FIG. 2B, having components b(s) g, 1≤g≤G:

$$B(s)=\{b(s)_1, b(s)_2, b(s)_3, b(s)_4, \ldots, b(s)_G\}=\{b(s)_g | \mathbb{R}^G\} \quad (2)$$

By using features from a hidden layer to distinguish emotional states of a person and determine emotion basis vectors B(s) that span the emotional states, in accordance with an embodiment of the disclosure, STEM-IDR may have enhanced sensitivity to nuances of emotional states that may provide STEM-IDR with improved resolution for distinguishing the way in which different people exhibit the same or similar emotional states. The enhanced sensitivity and resolution may provide for advantageous performance in identifying a person in a video in which the person appears.

Figure 3A:
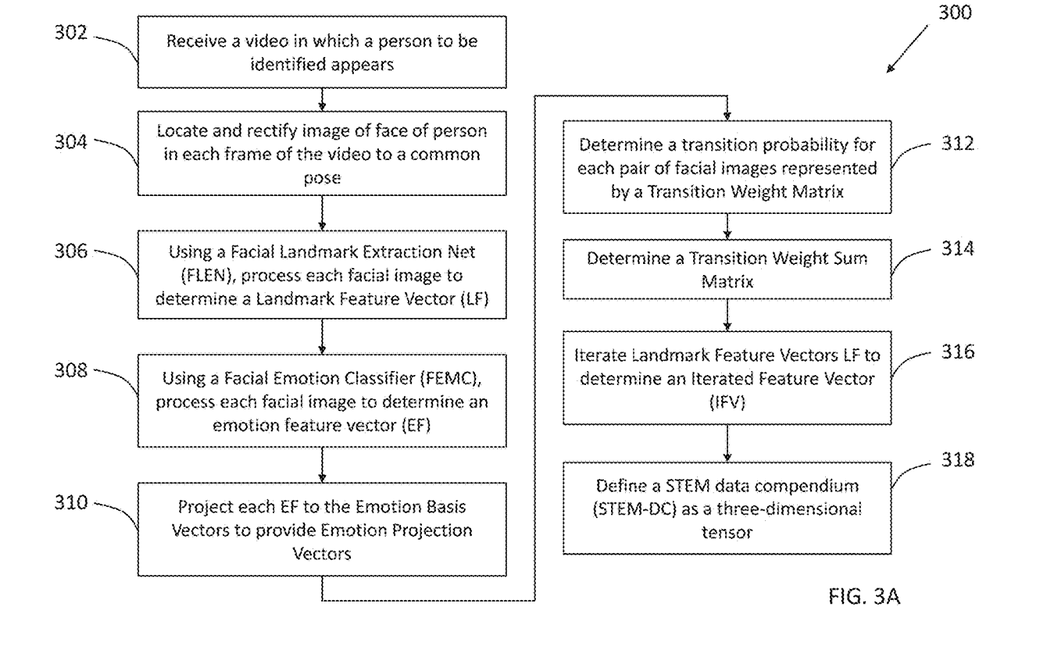
FIG. 3A shows a flow diagram of a process for processing a video to generate a STEM data compendium according to some implementations.

FIG. 3A shows a flow diagram of a process 300 for extracting STEM data from a video of a person to be identified and generating a STEM data compendium in accordance with an embodiment of the disclosure. FIGS. 3B-3E provide schematic illustrations of operation of process 300 and schematically show features and entities referred to in process 300, in accordance with an embodiment.

A non-transitory computer readable medium may contain instructions that when executed by at least one processor, causes the at least one processor to define a STEM data compendium from a video of a person to be identified such as in process 300. Process 300 may be a part of STEM-IDR. Process 300 may for example be performed by system 100 as described above. A non-transitory computer readable medium may contain instructions that when executed by at least one processor performs the operations described at each step as part of process 300. The at least one processor may correspond to system 100 and/or processing circuitry 110.

Figure 3B:
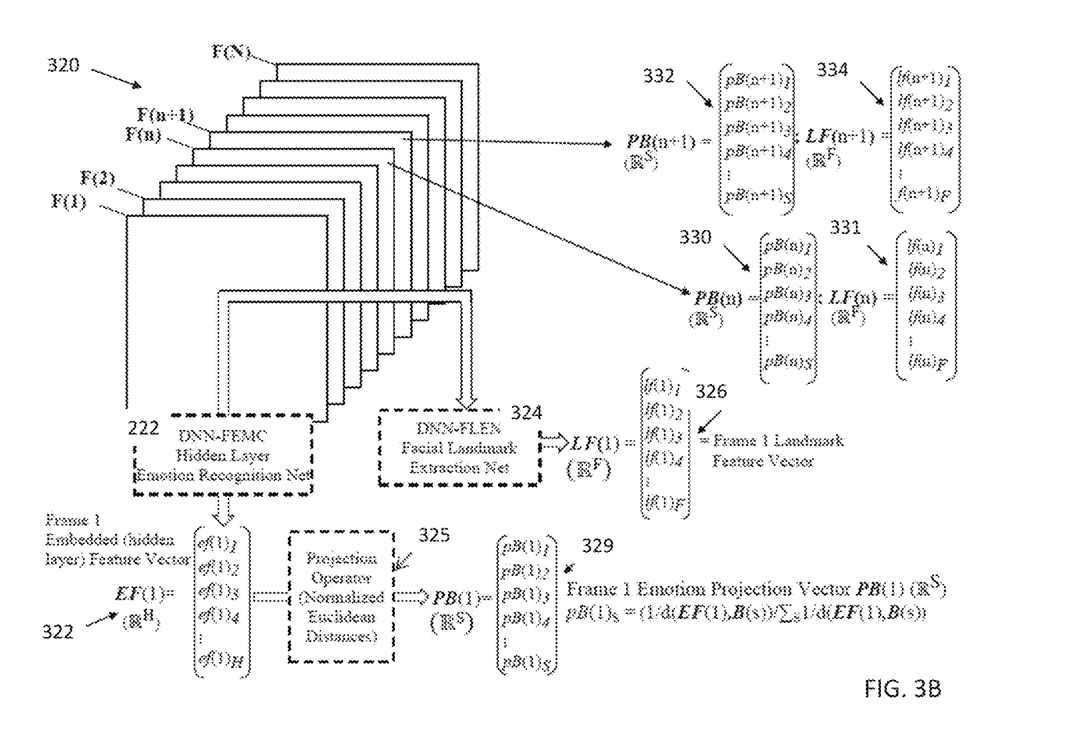
FIG. 3B shows a schematic visual illustration of actions in the flow diagram of FIG. 3A for determining an emotion projection vector and a landmark feature vector for each frame in a video, according to some implementations.

In step 302, a video 320 may be received including N frames F(n) 1≤n≤N, schematically shown in FIG. 3B, for processing to determine an identity of a person appearing in the video, in accordance with an embodiment of the disclosure. In some embodiments, STEM-IDR including processes 200, 300 and 400, may identify a person using facial characteristics or other identifying characteristics. Non-limiting examples of such characteristics may include gait or typing style or body identifiers, and so forth. The implementations and examples provided herein relate to facial identification, but this should not be considered limiting and it should be appreciated that the system described herein may be applied to identification of other identifiable characteristics associated with an individual to enable identification of the individual.

In some embodiments, video 320 may be provided with a frame rate that may be higher than 60 fps and this higher number of frames per time period may enable detection of micro-expressions herein defined as facial expressions lasting for very short periods of less than half a second. Thus, in some embodiments, the resolution of the determined basic emotional states may optionally be increased for video including a higher frame rate.

In step 304, an image of the person's face may be located in each frame and the image may then be rectified to a rectified facial image FI(n) so that the person's face in all the rectified facial images FI(n) appears in substantially a same desired pose and size. In some embodiments, the FI(n)

images may be rectified so that the person's face is in a full-face frontal pose and the images may be cropped to a same standard size.

In step 306, each of the facial images FI(n) may optionally be processed using a pretrained facial landmark extraction net (FLEN), such as by way of example, MobileNet-V1, to identify in the FI(n), L facial landmarks, each landmark characterized by P features from the facial image. In addition to the P features that FLEN extracts for each landmark identified by FLEN, each facial image FI(n) for a given video frame F(n) may also be associated with "V" additional spatiotemporal features that FLEN may not extract. In an embodiment, the additional features may include features determined responsive to the location and rectification procedure referred to in step 304. By way of example, the V additional features may include features from hidden layers of FLEN and/or features responsive to location and pose of the face in the frame and/or changes in the pose and/or location relative to a temporally adjacent frame. For a given facial image FI(n), a landmark feature vector LF(n) having L landmarks characterized by P features may have a dimension $\mathbb{R}^F$ where F=LxP+V. Letting $lf(n)_f$ represent an $f$-th feature of LF(n), LF(n) may be explicitly shown as:

$$LF(n)=\{lf(n)_1, lf(n)_2, \ldots, lf(n)_F\}=\{lf(n)_f | 1 \leq f \leq F\}. \quad (3)$$

For convenience and efficiency of presentation FLEN is considered to have provided the V as well as the P features that characterize a landmark.

Optionally, in step 308 the FEMC referenced in FIG. 2A and schematically shown as FEMC 222 in FIG. 2B, that was used to define the emotion basis vectors B(s)(vector 234 in FIG. 2B) may be used to extract an emotion feature vector $EF(n)(\mathbb{R}^H)$ for each facial image FI(n), where, $$EF(n)=\{ef(n)_1, ef(n)_2, \ldots ef(n)_H\}=\{ef(n)_h | 1 \leq h \leq H\}. \quad (4)$$

By way of example, FIG. 3B schematically shows deep neural network DNN-FEMC 222 extracting an embedded emotion vector EF(1) 322 from a facial image in Frame F(1). FIG. 3B also shows the FLEN as a DNN FLEN 324 extracting a landmark feature vector LF(1) 326 from image F(1), in accordance with an embodiment of the disclosure. Landmark feature vectors LF(n) and LF(n+1) 331 and 334 respectively extracted from facial images FI(n) and IFI(n+1) by FLEN are also schematically shown in FIG. 3B.

Optionally in step 310 each of the embedded emotion vectors EF(n) extracted from facial images FI(n) may be projected onto the S basis vectors B(s) (FIGS. 2A, 2B) to generate for each facial image an emotion projection vector PB(n) having components $pB(n)_S$ $1 \leq s \leq S$. The emotion projection vector may explicitly be written as:

$$PB(n)=\{pB(n)_1, pB(n)_2, \ldots pB(n)_S\}=\{pB(n)_S | 1 \leq s \leq S\}. \quad (5)$$

In some embodiments, a projection component $pB(n)_S$ may be determined by a Euclidean distance $d(EF(n),B(s))$ between the embedded emotion feature vector $EF(n)(\mathbb{R}^H)$ and the emotion basis vector B(s). Letting $d(EF(n),B(s))$ represent the Euclidean distance between EF(n) and B(s)pB $(n)_S$ may be determined in accordance with the expression (6), $$pB(n)_S=[1/d(EF(n),B(s))]/\Sigma_S 1/(d(EF(n),B(s))). \quad (6)$$

For situations in which the dimension G of the emotion basis vectors B(s) is less than the dimension of the embedded emotion feature vectors EF(n), the components of vectors EF(n) may be limited to components lying in the space of the emotion basis vectors B(s).

FIG. 3B schematically shows emotion projection vector PB(1) 329 generated by a projection operator 325 from EF(1) as well as PB(n) and PB(n+1) generated for facial images FI(n) and FI(n+1) provided by frames F(n) and F(n+1) respectively. It is noted that the projection components $pB(n)_S$ are normalized so that a sum $\Sigma_S[pB(n)_S]=1$ and that a given component $pB(n)_S$ determined for an embedded emotion feature vector EF(n) may be considered to be a probability that the person in facial image FI(n) is in a basic emotional state represented by emotion basis vector B(s). For convenience of presentation, a basic emotional state represented by an emotion basis vector B(s) $1 \leq s \leq S$ may be referred to as a basic emotional state BE(s).

In step 312 for each facial image FI(n) $1 \leq n \leq N-1$ an emotional state transition probability may be determined for the person having a probability pB(n); $1 \leq j \leq S$ of being in basic emotional state BE(j) in facial image FI(n) transitioning to a subsequent basic emotional state BE(k) in a subsequent facial image FI(n+1) for which the person has a probability $pB(n+1)_k$ of being in the subsequent emotional state BE(k). In some embodiments, let the transition probability be represented by a transition weight $w(n,n+1)_{j,k}$. In an embodiment, transition probability $w(n,n+1)_{j,k}$ may be determined in accordance with the expression (7), $$w(n,n+1)_{j,k}=pB(n)_j \cdot pB(n+1)_k. \quad (7)$$

If a set of transition probabilities $w(n,n+1)_{j,k}$ for facial images FI(n) and FI(n+1) is represented by a transition weight matrix W(n,n+1), then $$W(n,n+1)=\{w(n,n+1)_{j,k} | 1 \leq j,k \leq S\}. \quad (8)$$

It is noted that in general W(n,n+1) is not a symmetric matrix and $w(n,n+1)_{j,k} \neq w(n,n+1)_{k,j}$.

Figure 3C:
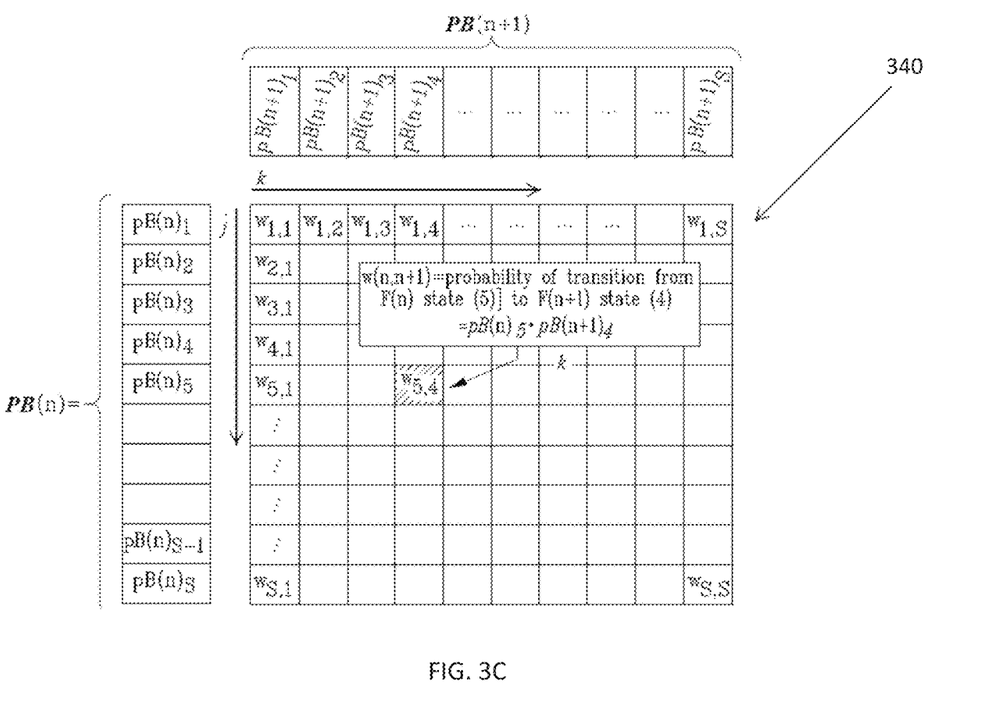
FIG. 3C shows a schematic visual illustration an array of transition probabilities determined for transitions between basic emotional states according to some implementations.

FIG. 3C schematically shows a transition weight matrix W(n,n+1) 340 determined by emotion projection vectors PB(n) and PB(n+1) in accordance with an embodiment of the disclosure.

Optionally in step 314 a transition weight sum matrix WSUM(n+1) may be determined in accordance with the expression (9):

$$WSUM(n+1) = \sum_{i=1}^{n} W(i, i+1)\{wsum(n+1)_{j,k} | 1 \leq j, k \leq S\}, \quad (9)$$

where, $$wsum(n+1)_{j,k} = \sum_{i=1}^{n} w(i, i+1)_{j,k}. \quad (10)$$

In step 316 the landmark feature vectors LF(n) may be iterated over n from n=1 to n=(N-1) to generate for the video an iterated feature vector $IFV(N)_{j,k,f}$ for each transition from a given basic emotional state BE(j) $1 \leq j \leq S$ to a given basic emotional state BE(k) $1 \leq k \leq S$. The iterated feature vector $IFV(N)_{j,k,f}$ for a given ordered pair of indices $1 \leq j,k \leq S$ may be a vector of dimension $\mathbb{R}^F$, that is a sum of vectors LF(n) weighted by functions of transition probabilities w(n, $n+1)_{j,k}$. In an embodiment, for an n-th iteration (n=1→N−1) and the given indices j,k, $$IFV(n+1)_{j,k,f}(\mathbb{R}^F)=\{IFV(n+1)_{j,k,f} | 1 \leq f \leq F\}, \quad (11)$$

where, $$IFV(n+1)_{j,k,f}=(wsum(n)_{j,k}/wsum(n+1)_{j,k}) \cdot IFV(n)_{j,k,f}+(w(n,n+1)_{j,k}/wsum(n+1)_{j,k}) \cdot lf(n+1)_f. \quad (12)$$

For a last (N−1)-th iteration, $$IFV(N)_{j,k}(\mathbb{R}^F)=\{IFV(N)_{j,k,f}|1\le f\le F\}, \quad (13)$$

and $$IFV(N)_{j,k,f}=(w\text{sum}(N-1)_{j,k}/w\text{sum}(N)_{j,k})IFV(N-1)_{j,k,f}+ (w(N-1,N)_{j,k}/w\text{sum}(N)_{j,k})\cdot lf(N)_f\}. \quad (14)$$

It is noted that $IFV(1)_{j,k,f}$ is not defined by equations (11)-(14). In an embodiment $IFV(1)_{j,k,f}$ may optionally be determined in accordance with an expression, $$IFV(1)_{j,k,f}=[w\text{sum}(N)_{j,k}/(N-1)]\cdot lf(1)_f \text{ or } =lf(1)_f \quad (15)$$

Figure 3D:
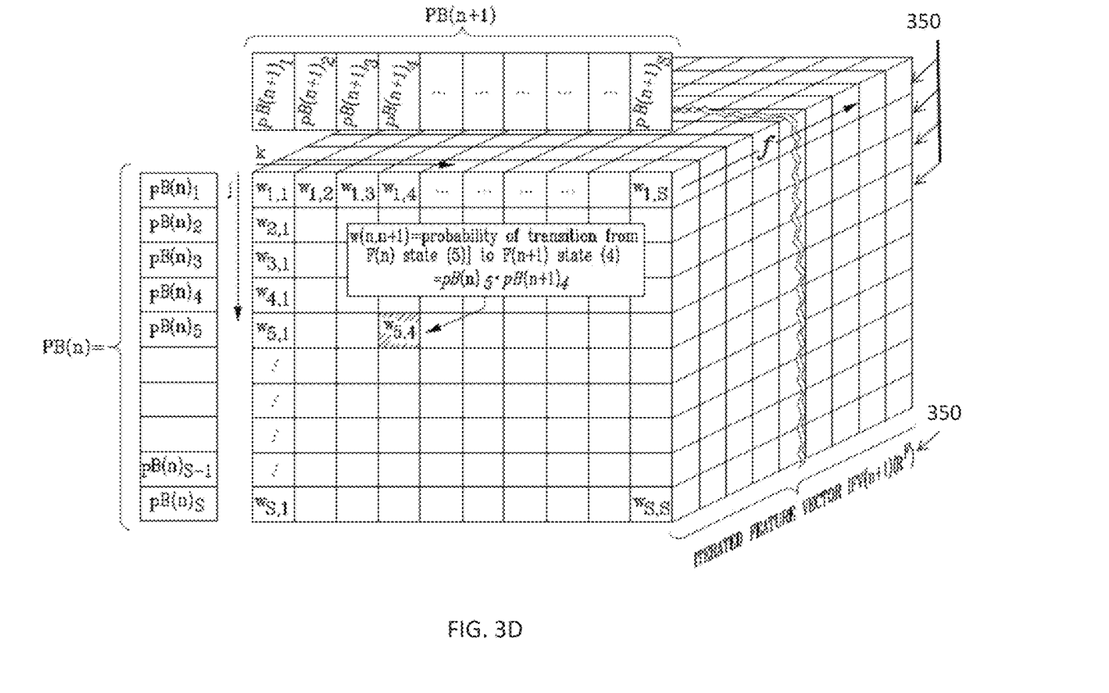
FIG. 3D shows a schematic visual illustration of an action in the flow diagram shown in FIG. 3A for using transition probabilities to iterate landmark feature vectors for temporally adjacent frames, according to some implementations.

$IFV(N)_{j,k}$ may be referred to as a Global Landmark Feature Vector (GLFV) for the transition from basic emotional state BE(j) to basic emotional state BE(k) for a video such as video 320 (FIG. 3B). FIG. 3D schematically shows iterated feature vectors IFV((n+1) 350 determined by an $n^{th}$ iteration for ordered pair of indices j,k.

In some embodiments, in step 318, a spatiotemporal emotion STEM data compendium may be defined as a three dimensional tensor STEM-DC:

$$\text{STEM-DC}(\mathbb{R}^{S\times S\times F})=\{IFV(N)_{j,k,f}|1\le j\le S, 1\le k\le S 1\le f\le F\}. \quad (16)$$

Figure 3E:
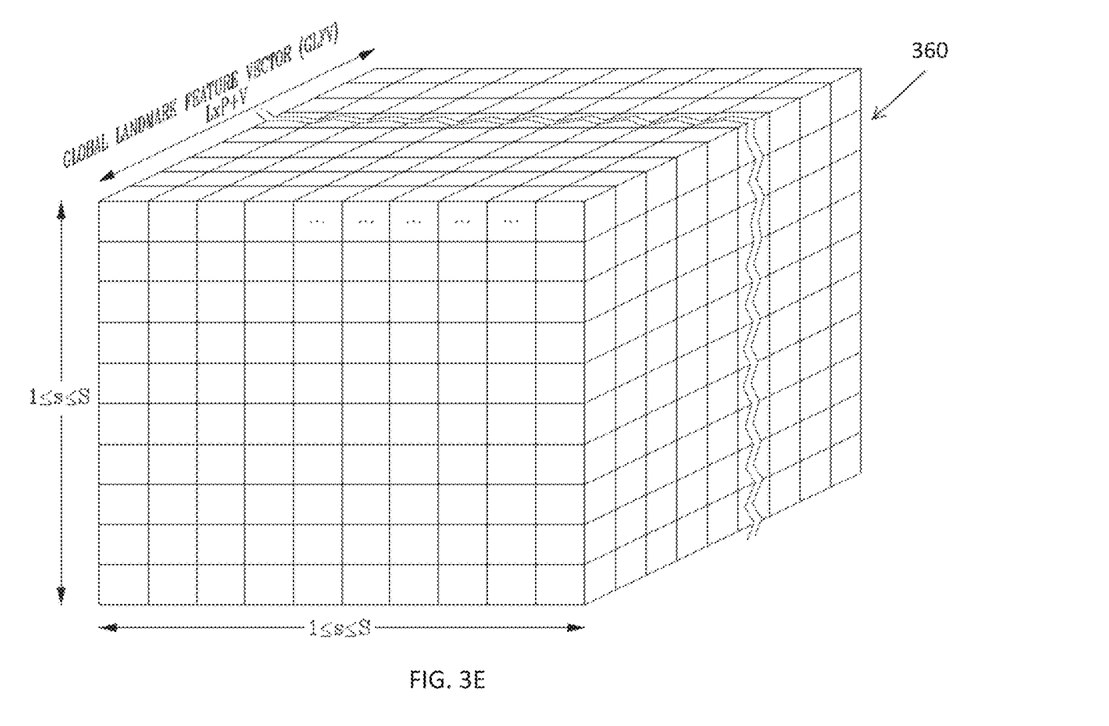
FIG. 3E schematically shows a STEM data compendium configured as a three-dimensional tensor for use in identifying a person, according to some implementations.

FIG. 3E schematically illustrates a three-dimensional STEM-DC 360 in accordance with an embodiment of the disclosure. STEM-DC 360 may also be referred to herein as an encoded state-transition matrix.

Figure 4A:
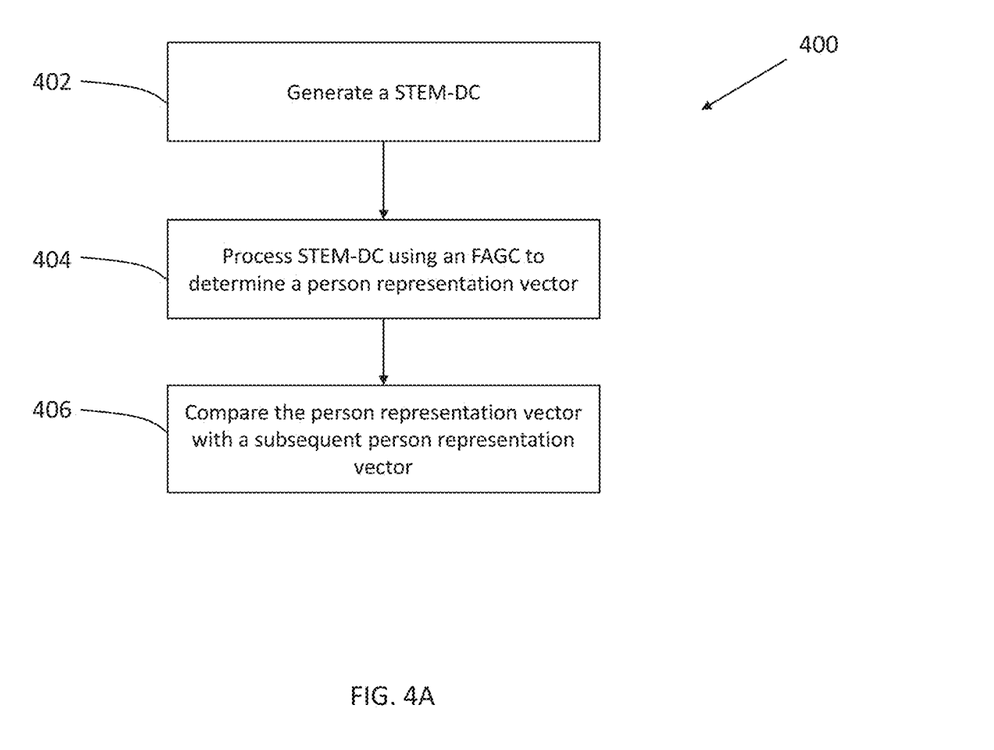
FIG. 4A shows a flow diagram of a process for processing a STEM data compendium using a fully adaptive graph convolutional network (FAGC) to determine a latent vector that represents a person in a video, according to some implementations.
Figure 4B:
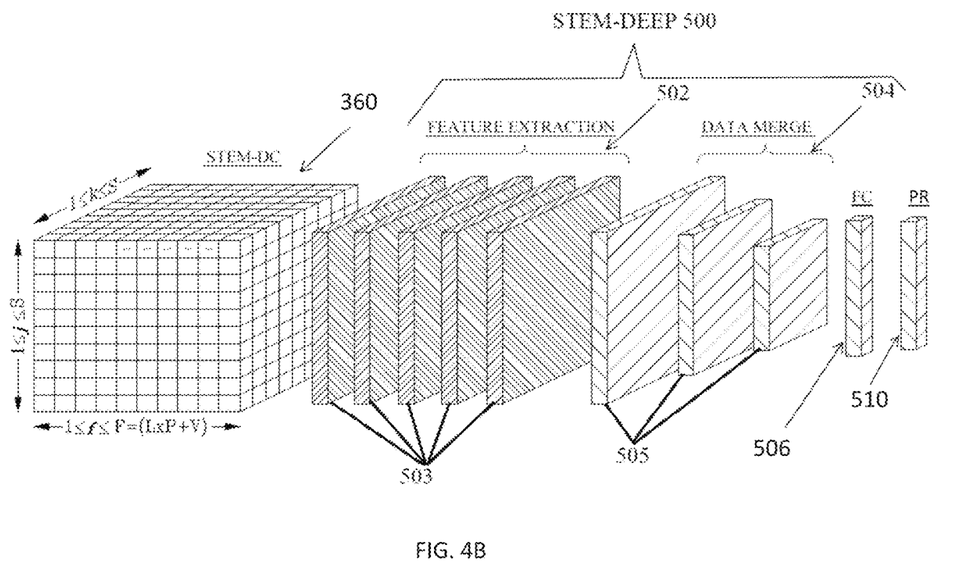
FIG. 4B schematically illustrates processing of a STEM data compendium using a fully adaptive graph convolutional network, according to some implementations.

FIG. 4A shows a flow diagram of a process 400 for processing a STEM-DC using a fully adaptive graph convolutional network (FAGC) to determine a latent vector that represents a person in a video, according to some implementations. FIG. 4B schematically illustrates process 400 including processing of a STEM-DC using a fully adaptive graph convolutional network. FAGC, according to some implementations. A non-transitory computer readable medium may contain instructions that when executed by at least one processor, causes the at least one processor to process a STEM-DC using a deep FAGC such as in process 400. Process 400 may be a part of STEM-IDR. Process 400 may for example be performed by system 100 as described above. A non-transitory computer readable medium may contain instructions that when executed by at least one processor performs the operations described at each step as part of process 400. The at least one processor may correspond to system 100 and/or processing circuitry 110.

In step 402, a STEM-DC may be generated such as by using process 300 described above. In step 402, in accordance with an embodiment of the disclosure, STEM-DC 360 may be processed by a deep FAGC, referred to herein as a STEM-DEEP net 500, or simply STEM-DEEP 500, to determine a latent vector that represents the person in video 320 (FIG. 3B) for which STEM-DC 360 was generated. In some embodiments, STEM-DEEP 500 may include a features extraction module 502 followed by a data merging module 504 which may produce the latent vector, optionally referred to as a STEM person representation vector (STEM-PR) and schematically shown as PR 510 in FIG. 4B. In some embodiments, in step 404, a first PR 510, determined for a specific individual from a provided video, may be compared with a subsequent second PR 510 determined from a subsequent video (by repeating steps 402 and 404) to thereby confirm the identity of the individual appearing in the subsequent video if the subsequent second PR 510 is substantially the same as the determined first PR 510.

In an embodiment, features extraction module 502 may include a plurality of, optionally five, FAGC blocks 503. Data merging module 504 may provide an output to a fully connected (FC) layer 506 that generates PR 510. In some embodiments, data merging module 504 may include a plurality of convolution blocks 505 that may be two-dimensional (2D), three-dimensional (3D), or of another suitable structure. In an embodiment, each FAGC block 503 may include a data driven attention tensor $A_{att}$ (not shown) and a learned adjacency matrix $A_{adj}$ (not shown) each having dimension $\mathbb{R}^{S^2\times S^2}$. If input features to a FAGC block 503 are represented by $InF_{in}$ and output features that the FAGC block 503 provides responsive to $InF_{in}$ are represented by $OtF_{out}$ operation of a given FAGC block 503 may be represented by an expression, $$OtF_{out}=W(OtF_{out}(A_{att}+A_{adj})), \quad (17)$$

where W represents the learned weight of the FAGC block 503.

In an embodiment, STEM-DEEP 500 may be trained on a training set of videos including a plurality of videos acquired for each of a plurality of different persons using a triplet margin loss (TML) function and a suitable distance metric. For each video in the training set of videos a STEM-DC 360 may be generated and processed using STEM-DEEP 500 to produce a STEM-PR 510 person representation vector. The TML operates to provide advantageous distances in accordance with the metric between the STEM-PR 510 vectors for different persons in the training set.

Unless otherwise defined, all technical and scientific terms used herein have the same meaning as commonly understood by one of ordinary skill in the art. The materials, methods, and examples provided herein are illustrative only and not intended to be limiting.

As used herein the terms "convolutional network", "neural network", "machine learning" or "artificial intelligence" refer to use of algorithms on a computing device that parse data, learn from the data, and then make a determination or generate data, where the determination or generated data is not deterministically replicable (such as with deterministically oriented software as known in the art).

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a processor chip or a circuit. As software or algorithm, selected steps of the disclosure could be implemented as a plurality of software instructions being executed by a computer/processor using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally form a "network" or a "computer network".

To provide for interaction with a user, the systems and techniques described here can be implemented on a computing device having a display (indicator/monitor/screen/array)(such as a LED (light-emitting diode), OLED (organic LED), LCD (liquid crystal display) or other display technology) for displaying information to the user and a keyboard and a pointing device (e.g., a mouse, joystick or a trackball) or individual buttons/knobs/levers (such as driving wheel buttons/signaling levers) by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, analysis of user head position and/or eye movements, or tactile input.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment or implementation are necessary in every embodiment or implementation of the disclosure. Further combinations of the above features and implementations are also considered to be within the scope of some embodiments or implementations of the disclosure.

While certain features of the described implementations have been illustrated as described herein, many modifications, substitutions, changes, and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations and embodiments described.

What is claimed is:

1. A system for identifying a person in a video, comprising:
   a computing device configured to generate a spatiotemporal emotion data compendium (STEM-DC) from the video; and to process the STEM-DC using a deep fully adaptive graph convolutional network (FAGC) to determine a first person representation vector that represents the person in the video,
   wherein the generating the STEM-DC includes generating an iterated feature vector (IFV), and wherein the generating the IFV includes iterating a series of landmark feature vectors weighted by functions of transition probabilities between basic emotional states of the person detected in subsequent frames of the video.

2. The system of claim 1, further configured to compare the first person representation vector with a subsequent second person representation vector determined from a subsequent video and subsequent STEM-DC, to thereby identify the person as appearing in the subsequent video when the first and second person representation vectors are substantially similar.

3. The system of claim 2, wherein the first and second person representation vectors are based on an identifiable trait of the person in the video.

4. The system of claim 3, wherein the identifiable trait includes at least one of face, emotion, gait, body, limb, or typing style.

5. The system of claim 1, wherein the functions of transition probabilities are represented by a transition weight sum matrix.

6. The system of claim 1, wherein each of the basic emotional states is determined by projecting an emotion feature vector onto a series of emotion basis vectors.

7. The system of claim 1, wherein each of the series of landmark feature vectors for a given facial image includes L landmarks characterized by P features.

8. The system of claim 7, wherein the series of landmark feature vectors is determined by processing facial images extracted from the video using a pretrained facial landmark extraction net (FLEN), to identify the L facial landmarks each characterized by P features.

9. The system of claim 8, wherein the facial images from the video are extracted by locating and rectifying images of a person's face located in the video.

10. The system of claim 1, wherein the FAGC includes a feature extraction module and a data merging module that includes a plurality of convolution blocks.

11. The system of claim 1, wherein a resolution of the basic emotional states is increased for a video having a higher frame rate.

* * * * *